US008751440B2

(12) United States Patent
Gorti et al.

(10) Patent No.: US 8,751,440 B2
(45) Date of Patent: *Jun. 10, 2014

(54) SYSTEM AND METHOD OF DETERMINING RELATIONSHIP INFORMATION

(71) Applicant: AT&T Intellectual Property I, L.P., Atlanta, GA (US)

(72) Inventors: Sreenivasa Gorti, Austin, TX (US); Robert Dailey, Austin, TX (US); Ankur Mukerji, Half Moon Bay, CA (US); Scott Thomas, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,352

(22) Filed: Mar. 26, 2013

(65) Prior Publication Data

US 2013/0218792 A1   Aug. 22, 2013

Related U.S. Application Data

(63) Continuation of application No. 13/443,080, filed on Apr. 10, 2012, now Pat. No. 8,429,119, which is a continuation of application No. 11/945,792, filed on Nov. 27, 2007, now Pat. No. 8,180,807.

(51) Int. Cl.
*G06F 17/30* (2006.01)

(52) U.S. Cl.
USPC ............................................ 707/603; 705/319

(58) Field of Classification Search
USPC ...................... 707/603, 802, 803; 705/319
See application file for complete search history.

(56) References Cited

U.S. PATENT DOCUMENTS

| 6,226,372 | B1 | 5/2001 | Beebe et al. |
| 6,681,108 | B1 | 1/2004 | Terry et al. |
| 6,917,610 | B1 | 7/2005 | Kung et al. |
| 7,143,091 | B2 | 11/2006 | Charnock et al. |
| 7,167,910 | B2 | 1/2007 | Farnham et al. |
| 7,177,880 | B2 | 2/2007 | Ruvolo et al. |
| 7,561,682 | B2 | 7/2009 | Doherty et al. |
| 7,596,386 | B2 | 9/2009 | Yach et al. |
| 8,180,807 | B2 | 5/2012 | Gorti et al. |
| 8,429,119 | B2 * | 4/2013 | Gorti et al. .................... 707/603 |
| 2002/0128033 | A1 | 9/2002 | Burgess |
| 2004/0122822 | A1 | 6/2004 | Thompson et al. |
| 2005/0117729 | A1 | 6/2005 | Reding et al. |
| 2005/0124320 | A1 | 6/2005 | Ernst et al. |
| 2006/0256959 | A1 | 11/2006 | Hymes |
| 2007/0005654 | A1 | 1/2007 | Schachar et al. |

(Continued)

OTHER PUBLICATIONS

Joan Morris DiMicco and David R. Millen, "Identify Management: Multiple Presentations of Self in Facebook", Proceedings Group '07 Proceedings of the 2007 International ACM Conference on Supporting Group Work, pp. 383-386, ACM.

*Primary Examiner* — Cheryl Lewis
(74) *Attorney, Agent, or Firm* — Keller Jolley Preece

(57) ABSTRACT

A method includes classifying a relationship between a first group and each of one or more additional groups based on at least one of a number of communications during a time period and a frequency of the communications. The communications are between one or more members of the first group and one or more members of each of the one or more additional groups. The method includes generating social network data based on the relationship between the first group and each of the one or more additional groups.

20 Claims, 4 Drawing Sheets

(56) References Cited

U.S. PATENT DOCUMENTS

| | | |
|---|---|---|
| 2007/0047522 A1 | 3/2007 | Jefferson et al. |
| 2007/0050456 A1 | 3/2007 | Vuong et al. |
| 2007/0208727 A1 | 9/2007 | Saklikar et al. |
| 2007/0239869 A1 | 10/2007 | Raghav et al. |
| 2008/0208812 A1 | 8/2008 | Quoc et al. |
| 2009/0030940 A1 | 1/2009 | Brezina et al. |
| 2009/0100321 A1 | 4/2009 | Singh et al. |

* cited by examiner

SYSTEM AND METHOD OF DETERMINING RELATIONSHIP INFORMATION

CLAIM OF PRIORITY

The present application claims priority from and is a continuation of U.S. patent application Ser. No. 13/443,080, filed Apr. 10, 2012, and entitled "SYSTEM AND METHOD OF DETERMINING RELATIONSHIP INFORMATION," which claims priority from and is a continuation of U.S. Pat. No. 8,180,807, filed Nov. 27, 2007, and entitled "SYSTEM AND METHOD OF DETERMINING RELATIONSHIP INFORMATION." Each of the above priority documents is expressly incorporated herein by reference in its entirety.

FIELD OF THE DISCLOSURE

The present disclosure is generally related to determining relationship information.

BACKGROUND

Social networking sites have become increasingly popular on the Internet. Sites such as Facebook (www.facebook.com) and Linkedin (www.linkedin.com) allow users to build networks of contacts. However, typically such networks are relatively siloed. For example, Facebook tends to be used for social networks involving personal relationships, whereas Linkedin tends to be used for social networks involving business relationships. Additionally, users of these sites are usually left to build the networks themselves. Hence, there is a need for an improved system and method of determining relationship information.

DETAILED DESCRIPTION OF THE DRAWINGS

Systems and methods of determining relationship information are provided. In a particular embodiment, a system may include processing logic and memory accessible to the processing logic. The memory may include instructions executable by the processing logic to access communication data associated with at least one first party. For example, the communication data may include at least a call log and an email log. The memory may also include instructions executable by the processing logic to analyze a plurality of communications between the at least one first party and at least one second party to automatically determine relationship information descriptive of a relationship between the at least one first party and the at least one second party. In an illustrative embodiment, the plurality of communications may include at least one call and at least one email message.

In a particular embodiment, a method of determining relationship information includes accessing communication data associated with at least one first party. For example, the communication data may include at least a call log and an email log. The method may also include analyzing a plurality of communications between the at least one first party and at least one second party to automatically determine relationship information descriptive of a relationship between the at least one first party and the at least one second party. The plurality of communications may include at least one call and at least one email message.

In a particular embodiment, a method of determining relationship information may include accessing communication data associated with a plurality of communications of at least one first party. The method may also include accessing location data associated with the at least one first party. The location data may include information about where the at least one first party was located at one or more times. The method may also include analyzing the communication data and the location data to automatically determine relationship information descriptive of a relationship between the at least one first party and at least one second party.

In another particular embodiment, a method of determining relationship information may include accessing communication data associated with at least one first party. The method may also include analyzing a plurality of communications between the at least one first party and at least one second party to automatically determine relationship information descriptive of a relationship between the at least one first party and the at least one second party. The relationship information may include a directionality of the relationship.

Other particular embodiments may include systems or computer readable media including instructions executable by a processor to implement any one or more of the methods of determining relationship information.

Figure 1:
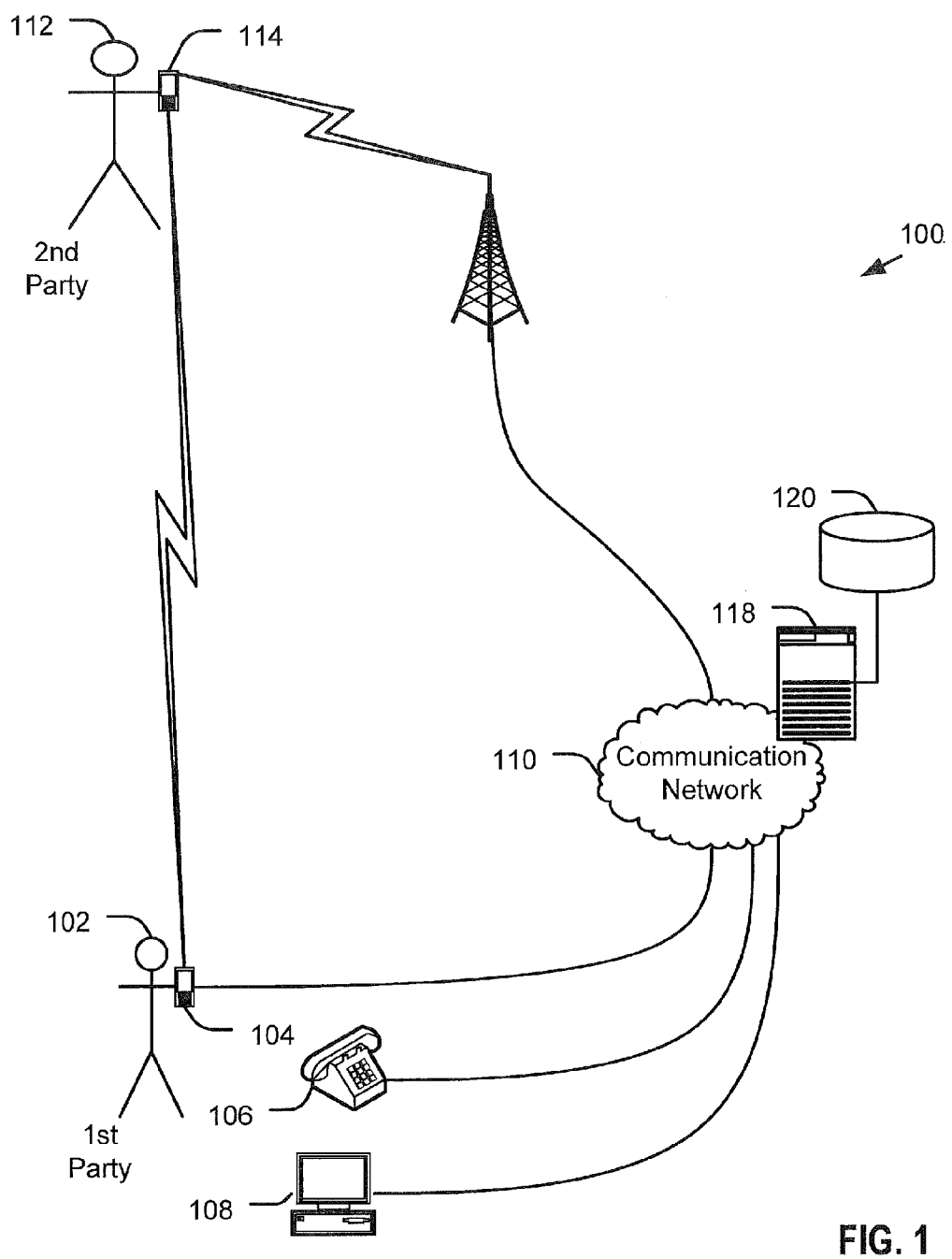
FIG. 1 is a diagram of an embodiment of a system to determine relationship information.

FIG. 1 depicts an embodiment of a system to determine relationship information, the system is generally designated 100. The system 100 includes a first party 102 and a second party 112. Each party 102 and 112 is associated with one or more communication devices such as a mobile communication device 104 and 114, a landline communication device 106, and a computing device 108. The particular communication devices are depicted as non-limiting examples of various types of communication devices to illustrate generally that various types of communication devices and various types of communications may be available to the parties 102 and 112.

The communication devices 104, 106, 108, 114 may be adapted to communicate with one another via one or more communication networks, such as a communication network 110. In a particular embodiment, the communication network 110 may be associated with a "triple-play" service provider that provides voice, data and video communications. In another embodiment, the communication network 110 may be associated with a communication service provider that provides wireless and landline communication services. In another embodiment, the communication network 110 may include communication networks associated with various communication service providers that together provide various communication services, such as wireless, landline, voice, multimedia, data, other types of real-time or time-delayed communication, or any combination thereof.

The system 100 may also include a communication data server 118. The communication data server 118 may include processing logic and memory accessible to the processing logic. The memory may include instructions executable by the processing logic to maintain or access communication data associated with communication services subscribers, which may include the first party 102, the second party 112, or both. For example, the communication data server 118 may maintain call logs, email logs, voicemail logs, other communication logs, or any combination thereof, associated with one or more communication service subscribers at a data store 120.

In a particular embodiment, the memory may include instructions executable by the processing logic to analyze the communication data to determine relationship information associated with the first party 102, the second party 112 or both. In an illustrative embodiment, the communication data server 118 may access data related to communications between the first party 102 and the second party 112 over a period of time, e.g., a period of days, weeks, months or years. The communication data server 118 may infer relationship information descriptive of a relationship between the first party 102 and the second party 112 based on the communication data. Additionally, the communication data server 118 may access location data associated with the first party 102, the second party 112 or both. The communication data server 118 may analyze the communication data and the location data to determine relationship information descriptive of a relationship between the first party 102 and the second party 112.

Figure 2:
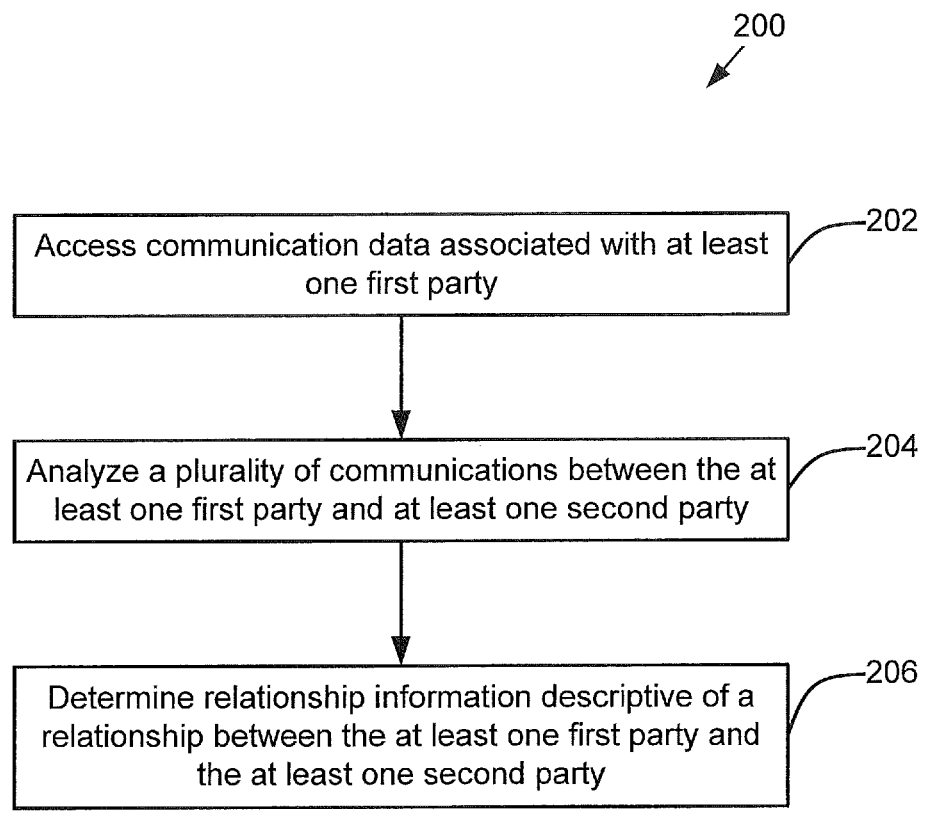
FIG. 2 is a flow chart of a first embodiment of a method of determining relationship information.

FIG. 2 depicts a first particular embodiment of a method of determining relationship information. The method is generally designated 200. The method 200 includes, at 202, accessing communication data associated with at least one first party. The communication data may include logs of communications to or from the at least one first party. The communication data may relate to various types of communications. For example, the communication data may relate to telephone calls, multimedia calls (e.g., video conferences), electronic data messages, such as electronic mail ("email") messages, short messaging service (SMS) messages, multimedia messaging service (MMS) messages, voicemail messages, other types of voice or data communications, or any combination thereof. The communication data may related to real-time communications (i.e., communications between two parties with little or no perceptible lag, such as a two-way telephone conversation or video conference), or time-delayed communications (i.e., non-real-time communications, e.g., messages sent from one party to a receiving device of another party, such as voice mail or email messages). Additionally, the communication data may relate to communications from various locations, such as a residence, a business or a location of a mobile communication device. In a particular illustrative embodiment, the communication data may be maintained by a service provider that provides mobile and landline voice and data communication services. The service provider may maintain the communication data for a variety of purposes, including to provide additional services to subscribers, such as automatic contact list management, or to provide marketing and service analysis.

In a particular illustrative embodiment, the communication data may include a call log. The call log may include information about one or more telephone calls made by or received by the first party. The call log may include information such as a duration of a call, a time of day of the call, a date of the call, a directionality of the call (e.g., who initiated the call), one or more locations associated with the call (e.g., where was the call initiated or received), other information about the call, or any combination thereof The location associated with the call may relate to a coordinate position of a party during the call, or a more general location designation such as, office, home, or mobile. In another particular illustrative embodiment, the communication data may include an email log. An email log may include information about one or more emails received by or sent by the first party. For example, the email log may include information such as a size of an email message, a time of day associated with the email message, a date associated with the email message, a directionality of the email message, other information about the email message, or any combination thereof In other particular illustrative embodiments, the communication data may include a log of other types of communications, such as a chat log, an SMS log, an MMS log, a voice mail log, a log associated with any other type of communication, or any combination thereof.

The method 200 also includes, at 204, analyzing a plurality of communications between at least one first party and at least one second party and, at 206, determining relationship information descriptive of a relationship between the at least one first party and the at least one second party. In an illustrative embodiment, the relationship information may relate to a strength of the relationship, a length of the relationship, a nature of the relationship (e.g., whether the relationship is a business or personal relationship), a directionality of the relationship (e.g., whether the relationship is symmetric or asymmetric), or any combination thereof.

Figure 3:
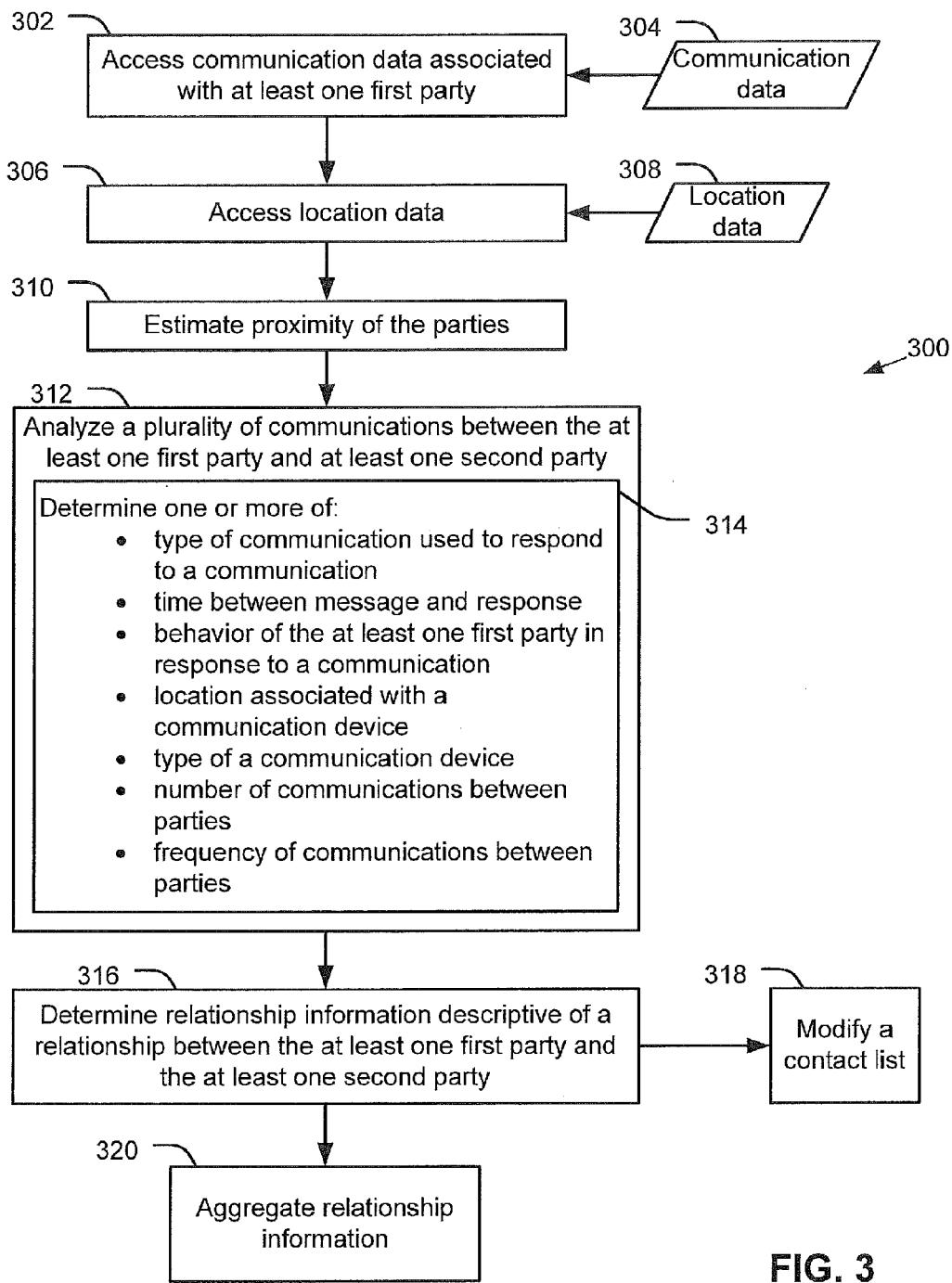
FIG. 3 is a flow chart of a second embodiment of a method of determining relationship information.

FIG. 3 depicts a second particular embodiment of a method of determining relationship information. The method is generally designated 300. The method 300 includes, at 302, accessing communication data 304 associated with at least one first party. The communication data 304 may include information related to any form of communication, such as data messages, voice messages, multimedia messages, real-time data communications, real-time voice communications, real-time multimedia communications, other types of communication, or any combination thereof. For example, the communication data 304 may include one or more communication logs associated with a communication service subscriber.

In a particular embodiment, the method 300 may also include, at 306, accessing location data 308. The location data 308 may be associated with the at least one first party, with one or more second parties, or with any combination thereof. For example, the location data 308 may include coordinate position information received from a global positioning system (GPS) receiver of a mobile communication device associated with the at least one first party. In a particular illustrative embodiment, the mobile communication device may send location data to a communication network when a communication is initiated or received. In another particular illustrative embodiment, the mobile communication device may send location data to the communication network periodically or occasionally. The communication network may include a location data store to maintain a location data log associated with the mobile communication device or the at least one first party. In another example, the location data 308 may include relative location information associated with the at least one first party and at least one second party. To illustrate, a first mobile communication device associated with the first party may include a short range transmitter, such as a Bluetooth transceiver, and a second mobile communication device associated with the second party may include a compatible receiver. Thus, when the first party and the second party are near one another, the first mobile communication device and the second mobile communication device may communicate directly with one another, e.g., in an ad-hoc peer-to-peer network. The first communication device, the second communication device, or both, may send information to the communication network indicating that the devices are proximate one another for some period of time.

In a particular embodiment, the location data 308 may be used, at 310, to estimate a proximity of the parties. The proximity of the parties may be determined during a communication or while no communication is occurring via a communication network. That is, the proximity may indicate that the parties were near each other, even when they are communicating in person, or are not communicating at all. For example, the proximity may be used to determine when the parties spent time in close proximity to one another. Such proximity information may indicate that the parties work near one another, reside near one another, or spend social time near one another. The location data 308 may also be used in conjunction with the communication data 304 to determine a location of one of the parties when a communication between the parties occurred.

The method 300 may also include, at 312, analyzing a plurality of communications between the at least one first party and the at least one second party. The communications may be analyzed to determine relationship information descriptive of a relationship between the at least one first party and the at least one second party, at 316. The analysis of the communications may include, at 314, determining one or more parameters related to the strength, length, directionality, or nature of the relationship. The parameters may include, for example, one or more of a type of communication, a time between a message and a response, how a party responded to notification of receipt of a communication, a location associated with a communication device, a location associated with a party, a type of a communication device, a number of communications between parties, a frequency of communications between parties, other information indicative of a relationship between the parties, or any combination thereof. A plurality of rules may relate the parameters individually, or in combination, to relationship information.

In a particular embodiment, a type of each communication or communication device used may indicate information about a relationship of the parties to a communication. To illustrate, the type of communication used may indicate a perceived urgency of the communication. For example, use of a more expensive form of communication, such as a mobile telephone, may indicate greater urgency than use of a less expensive form of communication, such as a landline telephone. Similarly, use of a real-time form of communication may indicate greater urgency than use of a time-delayed form of communication. The urgency of the communication, especially in combination with information about the communication, may be related to the strength, nature, or directionality of the relationship between the parties. For example, during a business day, an urgent communication may indicate that the communication is to an important client or coworker, thus, the time and type of communication together may indicate that the nature of the relationship between the parties is a business relationship. In another example, the urgency of the communication may indicate a strong relationship or an asymmetric relationship. In a particular embodiment, a plurality of communications may be analyzed to determine a pattern or trend of communications between the parties. To illustrate, a single urgent call during a business day may indicate a family emergency rather than an important business call. Therefore, analyzing a plurality of communications between the parties may more accurately determine the relationship information. In a particular illustrative embodiment, communications between the parties may be analyzed over a period of time, such as six months or more, to determine the relationship information. Additionally, analyzing the communications over a period of time may yield information about the length of the relationship.

In a particular embodiment, a time between message and response may indicate information about a relationship of the parties. For example, if a first party receives an email from a second party and waits several days before responding to the email, this may be an indication that the communication is not considered particularly urgent. In contrast, if the first party receives a voicemail from a second party and immediately places a call or sends an email to the second party, this may be an indication that the communication is somewhat urgent. The time between a message and a response may also be related to the directionality of the relationship. For example, an analysis of a plurality of communications between the parties may indicate that when the first party receives a message from the second party, the first party returns the communication relatively quickly, but there is a much longer delay when the second party receives a communication from the first party. Such communication data may indicate that the relationship between the first party and the second party is asymmetric. For example, the first party may be more reliant upon or subordinate to the second party. Additionally, the time between a message and response may be indicative of the nature of the relationship when considered in light of other parameters. For example, the communication data may indicate that even if a message is received during the business day, the first party usually waits to respond until after business hours. This may indicate that the relationship is a personal rather than a business relationship. Similarly, if the first party typically responds to messages from the second party during business hours, even if the message is received outside normal business hours, this may indicate that the relationship is a business rather than a personal relationship.

In a particular embodiment, how a party responds to notification of receipt of communication may indicate information about the relationship of the parties. For example, if the first party frequently rejects or defers incoming communications from the second party, this may be indicative of the strength or directionality of the relationship. To illustrate, if the first party regularly sends incoming calls from the second party to voicemail, this may indicate that the second party is more reliant upon or subordinate to the first party, or that the relationship is not very important to the first party. Information about how a party responds to notification of receipt of communications may also include the type of communication used by the party to respond to the communication. For example, if the second party sends an email to the first party, and the first party responds by making a telephone call to the second party, this may indicate that the first party places a higher priority on the communication, which may be indicative of the directionality or strength of the relationship.

In a particular embodiment, a location associated with a communication device or party may indicate information about a relationship of the parties. To illustrate, location data may be associated with a first party or a communication device of the first party. If the location data indicates that the first party primarily communicates with a second party from home, this may indicate information about the nature or strength of the relationship. For example, this may indicate that the relationship is a personal relationship rather than a business relationship. In another example, the location data may include information about the location of the second user during the communication. If the location data indicates that the first user communicates from home with the second user while the second user is at a work place associated with the first user, the communication may indicate a business rather than a personal relationship.

In a particular embodiment, location data may be used to determine information about the relative locations of the parties. To illustrate, the location data may include information about the proximity of the parties to one another during a communication or when no communication is occurring over a communication network (that is, face to face communication or communication of another communication network may be occurring). The proximity information may indicate information about the relationship of the parties. For example, if the parties spend a significant time in proximity to one another outside normal business hours, this may be an indication of a personal rather than a business relationship.

In a particular embodiment, a number of communications between parties or a frequency of communications between the parties may indicate information about a relationship of the parties to the communication. To illustrate, the communication data for a particular period of time, such as the previous six months may be analyzed to determine the relationship information. The communication data may indicate that communications between the first party and the second party have only occurred during the last two months. This may indicate information about the length of the relationship. In another example, a greater frequency of communication may indicate a stronger relationship. Additionally, in combination with other parameters, such as the directionality of the communications, other information about the relationship may be inferred. For example, if the first party calls the second party multiple times each day, but the second party rarely calls the first party, this may indicate an asymmetric relationship.

The relationship information may be used to determine information about an individual or a group. For example, a representation of a social network of an individual may be generated based on the relationship information. The representation of the social network or the relationship information may be used to assist the individual with contact management. In an illustrative embodiment, the representation of the social network or the relationship information may be used to modify a contact list associated with the individual, at 318. In another illustrative embodiment, a contact list may be modified to sort the contacts (e.g., according to the strength, directionality, length or nature of the relationship), to categorize contacts (e.g., as personal or business), or to add or delete contacts (e.g., to add frequently contacted parties or delete infrequently contacted parties).

In a particular embodiment, the relationship information may be aggregated with relationship information for other people of a group to generate a representation of a social network for the entire group of people, at 320. The representation of the social network may be used to assist with providing communication services, to market or design additional services, or for other marketing or communication service provisioning purposes.

Particular embodiments of the systems and methods disclose herein include automatic determination of relationship information based on historical communication data. The relationship information may be used to automatically manage contact information, such as generating or maintaining contact groups or lists.

Figure 4:
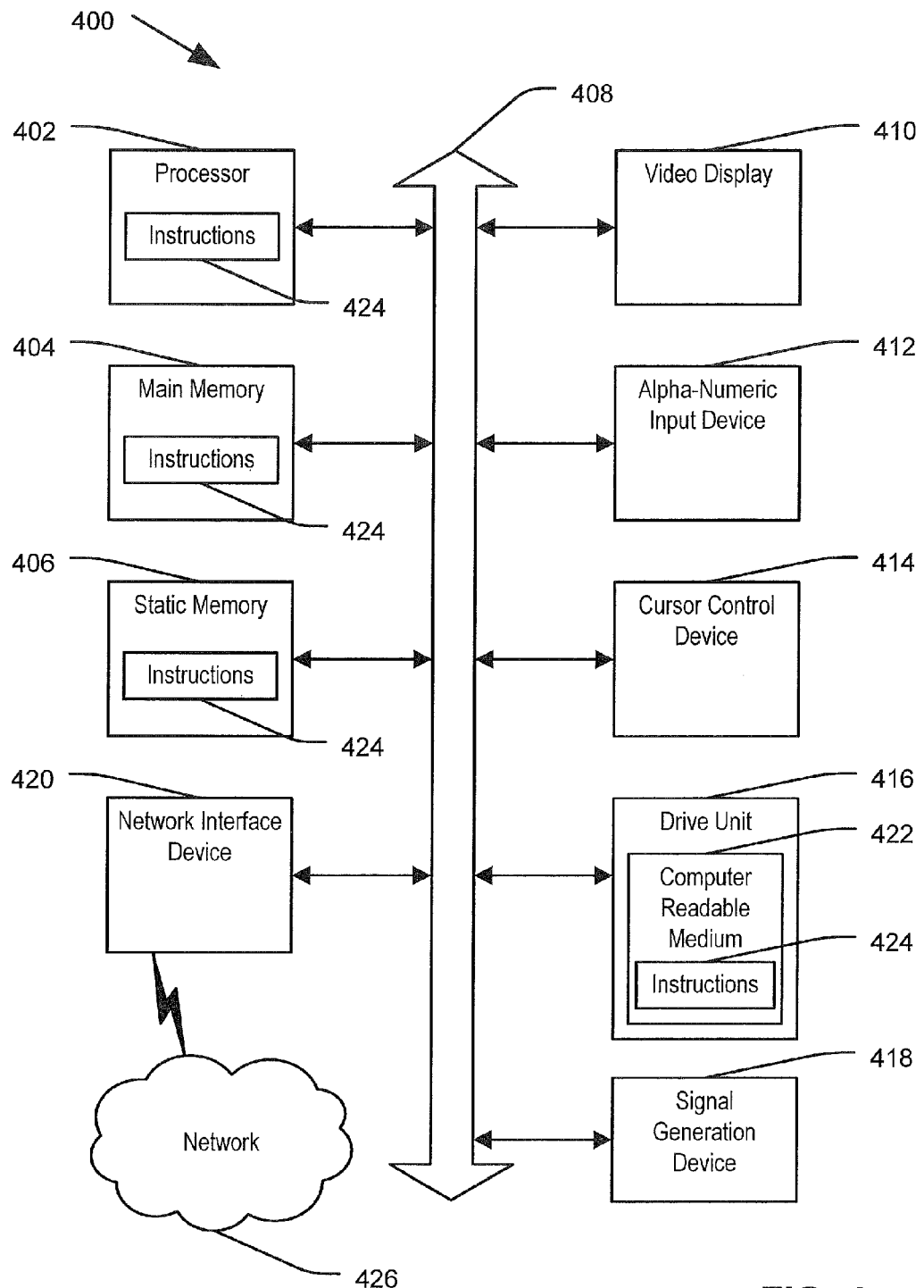
FIG. 4 is a block diagram of an illustrative computing system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system may include or be included within any one or more of the communication devices, the communication data server, or the data store depicted in FIG. 1.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse or remote control. The computer system 400 can also include a disk drive unit 416, a signal generation device 418, such as a speaker, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    determining a relationship between a first group and an additional group based on a number of communications during a time period, a frequency of the communications, or a combination thereof, the communications between a first set of members of the first group and a second set of members of the additional group; and
    generating social network data associated with the first group based on the relationship between the first group and the additional group.

2. The method of claim 1, wherein the social network data indicates the relationship between the first group and the additional group.

3. The method of claim 2, further comprising:
    analyzing aggregate social network data, wherein the aggregate social network data includes the social network data associated with the first group and additional social network data associated with the additional group; and
    provisioning a communication service based on an analysis of the aggregate social network data.

4. The method of claim 3, further comprising generating marketing data based on the analysis of the aggregate social network data, wherein the marketing data is associated with marketing of a service, the service including a telephone service, an electronic mail service, a short message service, a voice mail service, a multimedia messaging service, a chat service, or a combination thereof.

5. The method of claim 1, wherein the communications are associated with telephone calls, multimedia calls, electronic mail messages, short message service messages, voice mail messages, multimedia messaging messages, chat sessions, or a combination thereof.

6. The method of claim 1, further comprising analyzing communication data associated with the first set of members of the first group, wherein the communication data includes email logs, call logs, chat logs, short message service logs, multimedia message service logs, voice mail logs, or a combination thereof, and wherein the relationship between the first group and the additional group is determined based on an analysis of the communication data.

7. The method of claim 1, further comprising:
determining a first relationship between a first member of the first group and an additional member based on a first number of communications between the first member and the additional member, a first frequency of the communications between the first member and the additional member, or a combination thereof, wherein the additional member is a member of the first group or a member of the additional group; and
generating first social network data associated with the first member based on the first relationship between the first member and the additional member.

8. The method of claim 1, wherein the social network data indicates a strength of the relationship between the first group and the additional group, a directionality of the relationship between the first group and the additional group, or a combination thereof.

9. The method of claim 1, wherein the social network data indicates a type of the relationship between the first group and the additional group.

10. The method of claim 1, wherein the social network data includes information associated with a length of the relationship between the first group and the additional group.

11. The method of claim 1, wherein the communications include first communications between a first member of the first set of members and a second member of the second set of members, second communications between multiple members of the first set of members and the second member of the second set of members, third communications between the first member of the first set of members and multiple members of the second set of members, fourth communications between the multiple members of the first set of members and the multiple members of the second set of members, or a combination thereof.

12. A system comprising:
a processor; and
a memory storing instructions that, when executed by the processor, cause the processor to perform operations comprising:
determining a relationship between a first group and an additional group based on a number of communications during a time period, a frequency of the communications, or a combination thereof, the communications between a first set of members of the first group and a second set of members of the additional group; and
generating social network data based on the relationship between the first group and the additional group.

13. The system of claim 12, wherein the social network data indicates a strength of the relationship, and wherein the communications include first communications between a first member of the first set of members and a second member of the second set of members, second communications between multiple members of the first set of members and the second member of the second set of members, third communications between the first member of the first set of members and multiple members of the second set of members, fourth communications between the multiple members of the first set of members and the multiple members of the second set of members, or a combination thereof.

14. The system of claim 13, wherein the operations further comprise sorting a contact list of a member of the first group based on the strength of the relationship.

15. The system of claim 13, wherein the operations further comprise modifying a contact list associated with a member of the first group based on the social network data, and wherein modifying the contact list includes sorting the contact list, deleting a contact included in the contact list, adding a new contact to the contact list, or a combination thereof.

16. The system of claim 12, wherein the operations further comprise:
determining a first relationship between a first member of the first group and an additional member based on at least one of a first number of communications between the first member and the additional member, a first frequency of the communications, or a combination thereof, wherein the additional member is a member of the first group or a member of the additional group; and
generating first social network data associated with the first member based on the first relationship between the first member and the additional member.

17. The system of claim 16, wherein the operations further comprise:
classifying a type of the first relationship between the first member and the additional member, wherein the type of the first relationship is classified as a personal relationship or a business relationship; and
determining a directionality of the first relationship between the first member and the additional member based on the communications between the first member and the additional member, wherein the first social network data associated with the first member indicates the type and the directionality of the first relationship.

18. A computer-readable storage device comprising instructions that, when executable by a processor, cause the processor to perform operations comprising:
classifying a relationship between a first group and an additional group based on a number of communications during a time period, a frequency of the communications, or a combination thereof, the communications between a first set of members of the first group and a second set of members of the additional group; and
generating social network data based on the relationship between the first group and the additional group.

19. The computer-readable storage device of claim 18, wherein the operations further comprise generating a first social network of the first group, a second social network of the additional group, or a combination thereof.

20. The computer-readable storage device of claim 18, wherein the operations further comprise:
analyzing the social network data; and
generating marketing data based on an analysis of the social network data, wherein the marketing data is associated with marketing of a service, the service including a telephone service, an electronic mail service, a message service, a voice mail service, a multimedia messaging service, a chat service, or a combination thereof.

* * * * *